UNITED STATES PATENT OFFICE.

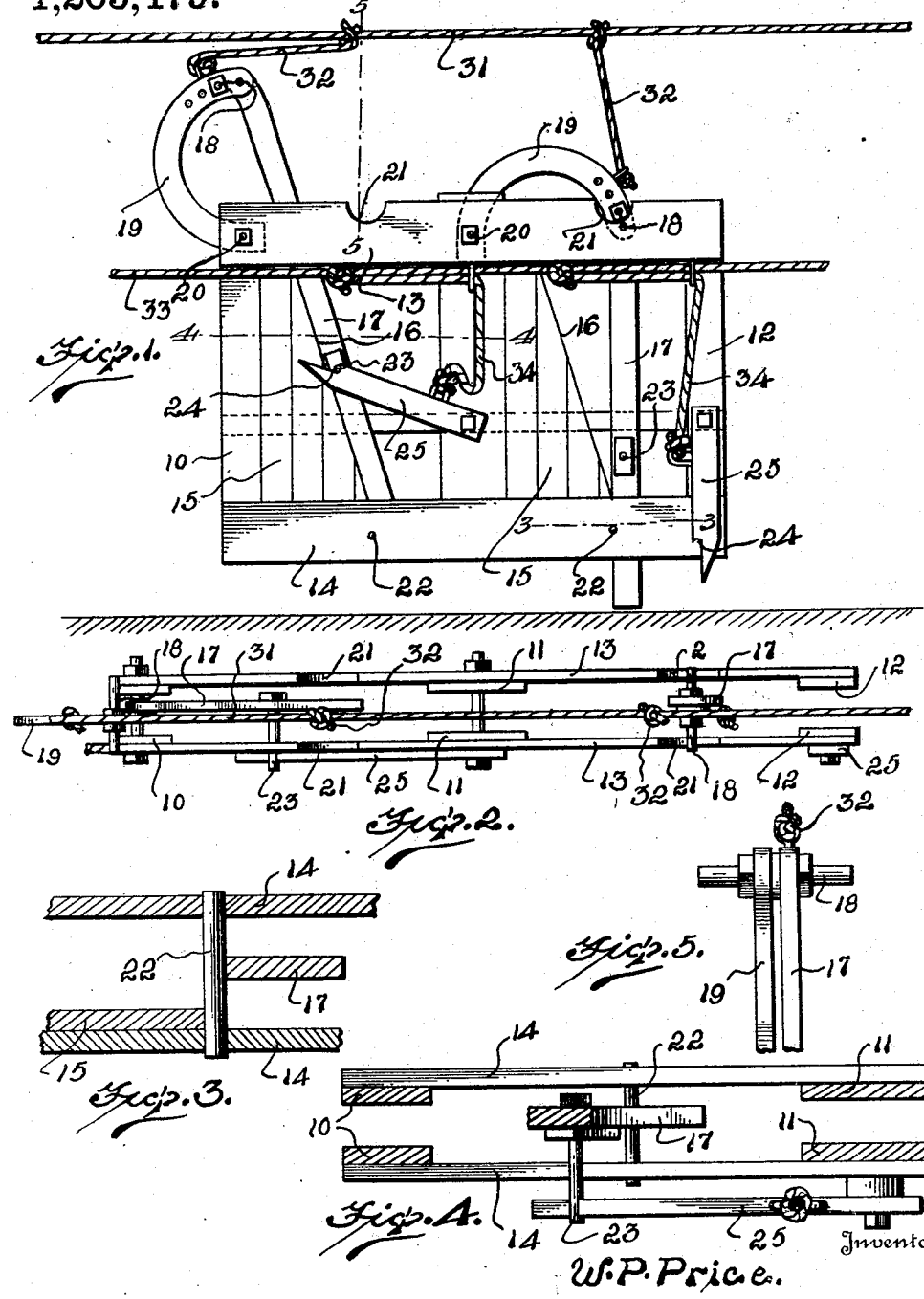

WILLIAM P. PRICE, OF MONTE VISTA, COLORADO.

CATTLE-STANCHION.

1,205,479.  Specification of Letters Patent.  Patented Nov. 21, 1916.

Application filed January 5, 1916. Serial No. 70,498.

*To all whom it may concern:*

Be it known that I, WILLIAM P. PRICE, a citizen of the United States, residing at Monte Vista, in the county of Rio Grande, State of Colorado, have invented certain new and useful Improvements in Cattle-Stanchions; and I do hereby declare the following to be a full, clear, and exact description of the invention, such as will enable others skilled in the art to which it appertains to make and use the same.

This invention relates to cattle stanchions.

The object of the invention resides in the provision of a cattle stanchion embodying an improved construction for holding the movable bar of the stanchion out of locking position and releasable by the movement of the animal's neck in the effort to partake of food to permit the bar to move automatically to locking position and thus prevent the animal leaving the stall until said bar is again set in release position.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a front elevation of a pair of stanchions constructed in accordance with the invention, the movable bar of one stanchion being set in unlocked position and the movable bar of the other stanchion being released and in locked position; Fig. 2, a plan view of the stanchion having its movable bar in locked position; Fig. 3, a section on the line 3—3 of Fig. 1; Fig. 4, a section on the line 4—4 of Fig. 1; and Fig. 5, a section on the line 5—5 of Fig. 1.

Referring to the drawings 10, 11 and 12 are upright stanchion bars connected together at their upper ends by double transverse bars 13 and at their lower ends by double transverse bars 14. Confined at their ends between the bars 13 and the bars 14 and disposed adjacent corresponding edges of the bars 10 and 11 are boards 15 the ends of which are beveled to form a continuous edge 16 of suitable inclination. Movable between the bars 13 and the bars 14 is a locking bar 17 the upper end of which is pivotally connected by a bolt 18 to the free end of an arm 19 and this arm 19 is pivotally mounted upon a bolt 20 between the bars 13. The outer bar 13 is recessed as at 21 and the wall of this recess is adapted to be engaged by the head of the bolt 18 to limit movement of the arm 19 in one direction. A pin 22 connects the bars 14 and serves to guide the lower end of the locking bar 17 during movement of said bar. Projecting from the outer side of the bar 17 is a pin 23 which is adapted to engage in a notch 24 in a locking lever 25, said locking levers being shown in this instance pivotally mounted upon the stanchion bars 11 and 12 respectively.

When the locking bars 17 are disposed in set or released position one edge of each bar engages the adjacent edge 16 as shown on the left hand side of Fig. 1. In this release position of the bar 17 the pin 23 is engaged in the notch 24 and the bar is positively supported by the locking lever 25. When the animal enters the stall the head thereof will pass between the bar 17 and one of the upright bars over the lever 25. As the animal lowers its head to partake of food its neck will come into engagement with the lever 25 and disengage the pin 23 from the notch 24 when the bar 17 and locking lever 25 and arm 19 will move under the influence of gravity to the position shown on the right hand side of Fig. 1 and thus secure the animal in the stall.

In order to provide means for releasing all the stanchions in a given row simultaneously there is provided a cable 31 suitably supported for longitudinal movement above the row of stanchions. This cable 31 is connected to respective arms 19 by means of branch cables 32. By pulling the cable 31 longitudinally in one direction it will be obvious that all the stanchions can be operated simultaneously to open position. On the other hand it will be obvious that each stanchion can be operated independently owing to the length of the branch cable 32. Another cable is suitably supported for longitudinal movement above the locking levers 25. This cable is connected to respective locking levers by means of branch cables 34. By pulling the cable 33 longitudinally in one direction it will be obvious that all of the locking levers can be operated into engagement with the related pin 23.

What is claimed is:—

A cattle stanchion comprising spaced upright bars, double transverse bars connecting the upright bars at their upper ends, double transverse bars connecting the upright bars at their lower ends, a plurality of movable bars guided between the upper and lower transverse bars, arms pivoted between the upper double transverse bars and having their free ends pivotally connected respectively to the upper ends of the movable bars, locking arms pivoted on respective upright bars engageable with respective movable bars to support the latter in released position, a cable above the pivoted arms, a flexible connection between the cable and each pivoted arm, a second cable above the locking arms and a flexible connection between the second cable and each locking arm.

In testimony whereof, I affix my signature, in the presence of two witnesses.

WILLIAM P. PRICE.

Witnesses:
OLA M. HAWKINS,
CHARLES M. CONLETT.

Copies of this patent may be obtained for five cents each, by addressing the "Commissioner of Patents, Washington, D. C."